US012309580B2

(12) United States Patent
Guo et al.

(10) Patent No.: US 12,309,580 B2
(45) Date of Patent: May 20, 2025

(54) MULTICAST BROADCAST SERVICE KEYS

(71) Applicant: Apple Inc., Cupertino, CA (US)

(72) Inventors: Shu Guo, Beijing (CN); Dawei Zhang, Saratoga, CA (US); Fangli Xu, Beijing (CN); Haijing Hu, Los Gatos, CA (US); Huarui Liang, Beijing (CN); Lanpeng Chen, Beijing (CN); Xiaoyu Qiao, Beijing (CN); Yuqin Chen, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/755,493

(22) PCT Filed: May 7, 2021

(86) PCT No.: PCT/CN2021/092126
§ 371 (c)(1),
(2) Date: Apr. 29, 2022

(87) PCT Pub. No.: WO2022/233029
PCT Pub. Date: Nov. 10, 2022

(65) Prior Publication Data
US 2024/0187849 A1     Jun. 6, 2024

(51) Int. Cl.
*H04W 12/041*   (2021.01)
*H04W 4/06*     (2009.01)
*H04W 12/0431*  (2021.01)

(52) U.S. Cl.
CPC ........... *H04W 12/041* (2021.01); *H04W 4/06* (2013.01); *H04W 12/0431* (2021.01)

(58) Field of Classification Search
None
See application file for complete search history.

(56) References Cited

U.S. PATENT DOCUMENTS

2008/0008176 A1* 1/2008 Lim ............... H04W 72/30
                                                370/390
2021/0067958 A1* 3/2021 Lee ............... H04W 12/106
(Continued)

FOREIGN PATENT DOCUMENTS

CN   106922216   7/2017
CN   112311543   2/2021

OTHER PUBLICATIONS

3GPP, "ETSI TS 124 501 V16.5.1 (Aug. 2020) 5G; Non-Access-Stratum (NAS) protocol for 5G System (5GS); Stage 3 (3GPP TS 24.501 version 16.5.1 Release 16)", Aug. 2020 (Year: 2020).*
(Continued)

*Primary Examiner* — Philip J Chea
*Assistant Examiner* — James Ross Hollister
(74) *Attorney, Agent, or Firm* — Fay Kaplun & Marcin, LLP

(57) ABSTRACT

A user equipment (UE) is configured to join a multicast broadcast service (MBS) session. The UE sends, to a network function, a protocol data unit (PDU) modification request comprising a request to join a multicast broadcast service (MBS) session, generates a first key ($K_{MBS-UE}$), receives a PDU session modification complete message comprising an encrypted second key ($K_{MBS}$) and a key identification (KID) corresponding to the $K_{MBS}$ and decrypts the Kiss using the $K_{MBS-UE}$.

14 Claims, 3 Drawing Sheets

(56) References Cited

U.S. PATENT DOCUMENTS

| | | | | |
|---|---|---|---|---|
| 2022/0329983 A1* | 10/2022 | Jeong | .................... | H04W 12/06 |
| 2023/0179400 A1* | 6/2023 | Guo | .................... | H04W 12/041 |
| | | | | 713/171 |
| 2023/0396433 A1* | 12/2023 | Guo | ...................... | H04L 9/0891 |
| 2024/0155340 A1* | 5/2024 | Rajadurai | ........... | H04W 12/033 |

OTHER PUBLICATIONS

Huawei et al., "New solution to protect MBS traffic in service layer", 3GPP TSG-SA3 Meeting #100-bis-e, S3-202478, Oct. 16, 2020, 3 sheets.

"Study on Security Aspects of Enhancements for 5G Multicast-Broadcast Services (Mbs)" 3GPP TR 33.850, v0.5.0, Release 17, Mar. 15, 2021.

* cited by examiner

MULTICAST BROADCAST SERVICE KEYS

BACKGROUND

A 5G new radio (NR) network may support both unicast and multicast services. Multicast refers to a point-to-multipoint communication scheme where the same data is transmitted from a single source to multiple endpoints at the same time. In contrast to multicast, unicast refers to a point-to-point communication scheme where data is transmitted from a source to a single endpoint. A user equipment (UE) may be configured to receive data via unicast and/or multicast when connected to the 5G NR network.

SUMMARY

Some exemplary embodiments are related a processor of a user equipment (UE) configured to perform operations. The operations include sending, to a network function, a protocol data unit (PDU) modification request comprising a request to join a multicast broadcast service (MBS) session, generating a first key ($K_{MBS-UE}$), receiving a PDU session modification complete message comprising an encrypted second key ($K_{MBS}$) and a key identification (KID) corresponding to the $K_{MBS}$ and decrypting the $K_{MBS}$ using the $K_{MBS-UE}$.

Other exemplary embodiments relate to a first network function configured to perform operations. The operations include receiving an indication that a user equipment (UE) is requesting to join a multicast broadcast service (MBS) session, sending, in response to receiving the indication, a MBS key request to a second network function, receiving, in response to the MBS key request, an MBS key response comprising a first key ($K_{MBS-UE}$) from the second network function, receiving, from a third network function, information related to the MBS session, wherein the information comprises a second key ($K_{MBS}$) and a key identification (KID) corresponding to the $K_{MBS}$, generating a PDU session modification complete message comprising the $K_{MBS}$ and the KID, wherein at least the $K_{MBS}$ is encrypted using the $K_{MBS-UE}$ and sending the PDU session modification complete message to the UE.

Still further exemplary embodiments are related to a first network function configured to perform operations. The operations include receiving, from a user equipment (UE), a protocol data unit (PDU) modification request comprising a request to join a multicast broadcast service (MBS) session, sending, to a second network function, a request for information related to the MBS session, receiving, from the second network function, the information related to the MBS session, wherein the information includes a key ($K_{MBS}$) for the MBS session and a key identification (KID) corresponding to the $K_{MBS}$ and sending, to a third network function, the information related to the MBS session.

Additional exemplary embodiments are related to a first network function configured to perform operations. The operations include generating a key ($K_{MBS}$) and a key identification (KID) corresponding to the $K_{MBS}$ for an MBS session and sending the $K_{MBS}$ and the KID to a second network function during a procedure for a user equipment (UE) to join the MBS session.

Further exemplary embodiments are related to a first network function configured to perform operations. The operations include receiving a multicast broadcast service (MBS) key request from a second network function, generating, in response to receiving the MBS key request, a first key ($K_{MBS-UE}$) and sending, to the second network function, an MBS key response comprising the $K_{MBS-UE}$.

DETAILED DESCRIPTION

Figure 1:
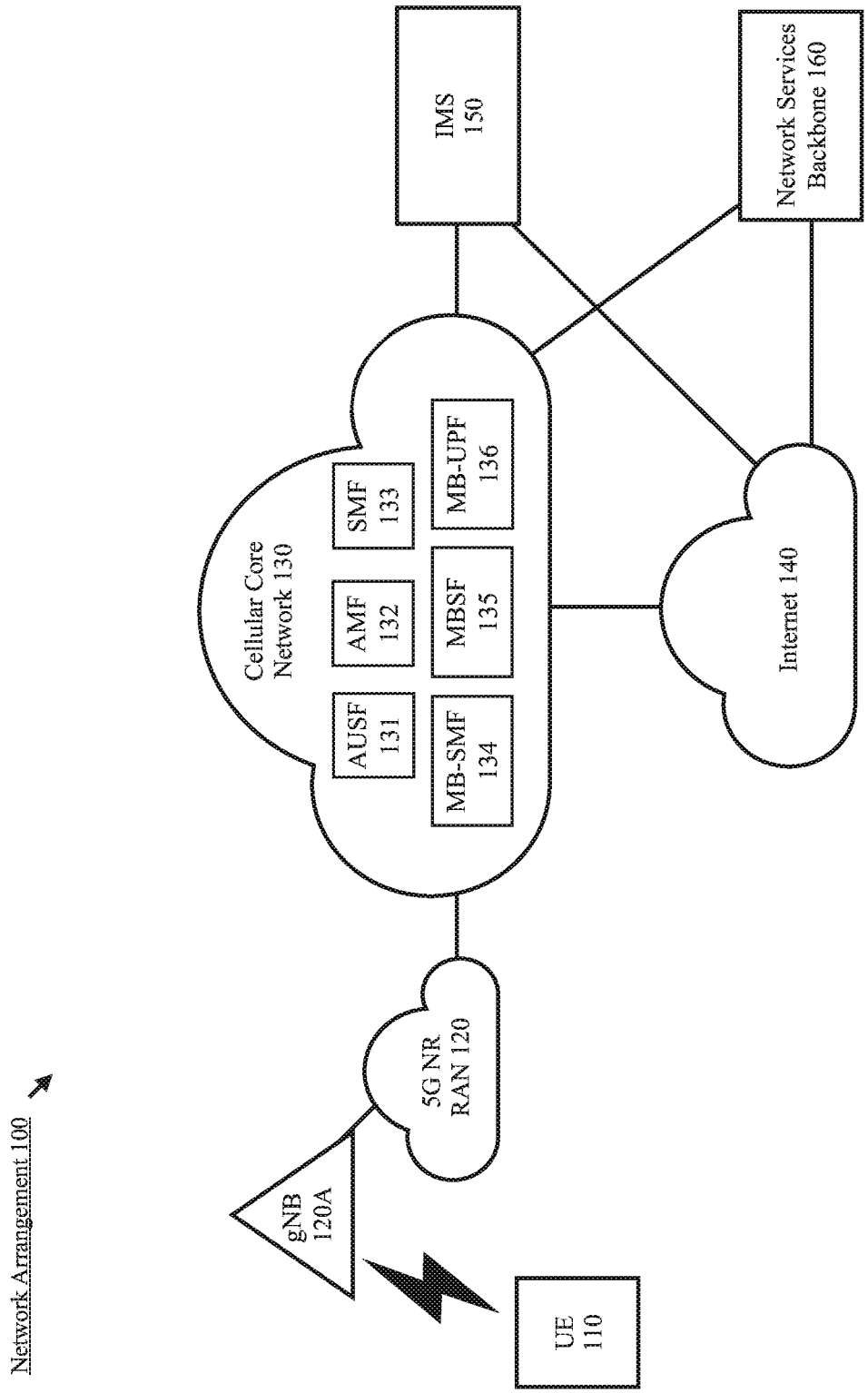
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments relate to implementing Multicast Broadcast Service (MBS) Enhanced Key distribution for Multicast for 5G New Radio (NR).

MBS generally refers to an aspect of a 5G NR network capable of delivering the same content to multiple recipients. Throughout this description examples of MBS functionality are described with regard to multicast. Multicast refers to a point-to-multipoint communication scheme where data is delivered from a single source to multiple endpoints at the same time. However, reference to multicast service is merely provided for illustrative purposes, those skilled in the art will understand that the exemplary concepts described herein are also applicable to broadcast service.

The exemplary embodiments are also described with regard to an MBS session. Throughout this description, the term "MBS session" may refer to a communication session that is configured to deliver data to the UE via multicast. The MBS session may include an "MBS bearer." Similar to the function of a protocol data unit (PDU) session, the MBS bearer may deliver data from a source to the UE through the 5G NR network. Any reference to an MBS session or an MBS bearer is merely provided for illustrative purposes. Different entities may refer to similar concepts by a different name.

The 5G NR network should support confidentiality protection, integrity protection, and anti-replay protection for MBS traffic. This may be done through the use of keys for the MBS service. The key distribution and the MBS traffic should also be protected. This results in various issues related to key distribution and authorization such as how to support the necessary level(s) of authorization for UEs to access multicast communication services and how can a UE join/leave (including authorized or revoked to access) a multicast communication service.

The exemplary embodiments include various techniques to distribute the keys securely to protect the MBS traffic. There is an existing procedure for a UE to join an MBS session. This existing procedure is based on a PDU session modification request from the UE. However, the PDU session modification complete message may not be encrypted. If there is no protection on this message, the key delivery is not secure. For MBS, it may be important to encrypt the data flow. Thus, the exemplary embodiments include a procedure to protect the MBS key, $K_{MBS}$, using a shared key base. Specific examples of the exemplary procedure will be described in more detail below.

FIG. 1 shows an exemplary network arrangement 100 according to various exemplary embodiments. The exemplary network arrangement 100 includes UE 110. Those skilled in the art will understand that the UE 110 may be any type of electronic component that is configured to communicate via a network, e.g., mobile phones, tablet computers, desktop computers, smartphones, phablets, embedded devices, wearables, Cat-M devices, Cat-M1 devices, MTC devices, eMTC devices, other types of Internet of Things (IOT) devices, etc. An actual network arrangement may include any number of UEs being used by any number of users. Thus, the example of a single UE 110 is only provided for illustrative purposes.

The UE 110 may be configured to communicate with one or more networks. In the example of the network configuration 100, the network with which the UE 110 may wirelessly communicate is a 5G NR radio access network (RAN) 120. However, the UE 110 may also communicate with other types of networks (e.g. 5G cloud RAN, an LTE RAN, a legacy cellular network, a WLAN, etc.) and the UE 110 may also communicate with networks over a wired connection. With regard to the exemplary embodiments, the UE 110 may establish a connection with the 5G NR RAN 120. Therefore, the UE 110 may have a 5G NR chipset to communicate with the NR RAN 120.

The 5G NR RAN 120 may be a portion of a cellular network that may be deployed by a network carrier (e.g., Verizon, AT&T, T-Mobile, etc.). The 5G NR RAN 120 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set.

In network arrangement 100, the 5G NR RAN 120 includes a cell 120A that represents a gNB. However, an actual network arrangement may include any number of different types of cells being deployed by any number of RANs. Thus, the example of a single cell 120A is merely provided for illustrative purposes.

The UE 110 may connect to the 5G NR-RAN 120 via a base station, e.g., next generation Node B (gNB) 120A. Those skilled in the art will understand that any association procedure may be performed for the UE 110 to connect to the 5G NR-RAN 120. For example, as discussed above, the 5G NR-RAN 120 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific base station (e.g., the gNB 120A). However, as mentioned above, reference to the 5G NR-RAN 120 is merely for illustrative purposes and any appropriate type of RAN may be used.

The network arrangement 100 also includes a cellular core network 130. The cellular core network 130 may be considered to be the interconnected set of components or functions that manage the operation and traffic of the cellular network. In this example, the components or functions include an authentication server function (AUSF) 131, an access and mobility management function (AMF) 132, a session management function (SMF) 133, a multicast broadcast SMF (MB-SMF) 134, a multicast broadcast service function (MBSF) 135 and a multicast broadcast user plane function (MB-UPF) 136. However, an actual cellular core network may include various other components performing any of a variety of different functions.

The AUSF 131 may store data for authentication of UEs and handle authentication-related functionality. The AUSF 131 may be equipped with one or more communication interfaces to communicate with other network components (e.g., network functions, RANs, UEs, etc.). The exemplary embodiments are not limited to a AUSF that performs the above reference operations. Those skilled in the art will understand the variety of different types of operations a AUSF may perform. Further, reference to a single AUSF 131 is merely for illustrative purposes, an actual network arrangement may include any appropriate number of AUSFs.

The AMF 132 may receive connection and session related information from UEs and may be responsible for handling connection and mobility management tasks. Session management related messages may be forwarded to the SMF 133. Those skilled in the art will understand the variety of different types of operations an AMF may perform. Further, reference to a single AMF 132 is merely for illustrative purposes, an actual network arrangement may include any appropriate number of AMFs.

The SMF 133 performs operations related to session management such as, but not limited to, session establishment, session release, IP address allocation, policy and quality of service (QOS) enforcement, etc. The SMF 133 may be equipped with one or more communication interfaces to communicate with other network components (e.g., network functions, RANs, UEs, etc.). The exemplary embodiments are not limited to an SMF that performs the above reference operations. Those skilled in the art will understand the variety of different types of operations a SMF may perform. Further, reference to a single SMF 133 is merely for illustrative purposes, an actual network arrangement may include any appropriate number of SMFs.

The MB-SMF 134 performs functions to specifically support MBS functionality. In general, the MB-SMF 134 supports MBS session management (including QoS control) and configures the MB-UPF 136 for multicast and broadcast flows transport based on the policy rules for multicast and broadcast services from a policy control function (PCF) (not shown) or local policy. With respect to broadcast sessions, the MB-SMF 134 interacts with the 5G NR-RAN 120, via the AMF 132, to control data transport using a 5GC Shared MBS traffic delivery method. With respect to multicast sessions, the MB-SMF, interacts with the SMF 133 to modify PDU sessions associated with MBS and interacts with the 5G NR RAN 120 (via the AMF 132 and the SMF 133) to establish data transmission resources between the MB-UPF 136 and nodes of the 5G NR RAN 120 for 5GC Shared MBS traffic delivery method. Those skilled in the art will understand the variety of different types of operations a MB-SMF may perform. Further, reference to a single MB-SMF 134 is merely for illustrative purposes, an actual network arrangement may include any appropriate number of MB-SMFs.

The MBSF 135 performs functions to specifically support MBS functionality. For example, the MBSF 135 provides service level functionality to support MBS and interworking with LTE MBMS, interacting with an application function (AF) (not shown) and the MB-SMF 134 for MBS session operations, determining transport parameters, and session transport. The MBSF 135 may also select a serving MB-SMF 134 for an MBS Session and determine a sender IP multicast address for the MBS session. Those skilled in the art will understand the variety of different types of operations a MBSF may perform. Further, reference to a single MBSF 135 is merely for illustrative purposes, an actual network arrangement may include any appropriate number of MBSFs.

The MB-UPF 136 performs functions to specifically support MBS functionality. In general for multicast and broadcast sessions, the MB-UPF 136 performs packet filtering of incoming downlink packets for multicast and broadcast flows, Qos enforcement and counting/reporting, interacts with the MB-SMF 134 for receiving multicast and broadcast data, and delivers multicast and broadcast data to RAN nodes for a 5GC Shared MBS traffic delivery method. With respect to multicast sessions, the MB-UPF 136 may deliver multicast data to a user plane function (UPF) (not shown) for a 5GC Individual MBS traffic delivery method. Those skilled in the art will understand the variety of different types of operations a MB-UPF may perform. Further, reference to a single MB-UPF 136 is merely for illustrative purposes, an actual network arrangement may include any appropriate number of MB-UPFs.

The above description provided various operations that may be supported by the exemplary core network functions. However, it should be understood that these operations are only exemplary and each of the functions may perform other operations. With respect to the exemplary embodiments related to distributing keys to protect the MBS traffic, various operations performed by the exemplary core network functions will be described in greater detail below.

The network arrangement 100 also includes the Internet 140, an IP Multimedia Subsystem (IMS) 150, and a network services backbone 160. The cellular core network 130 manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
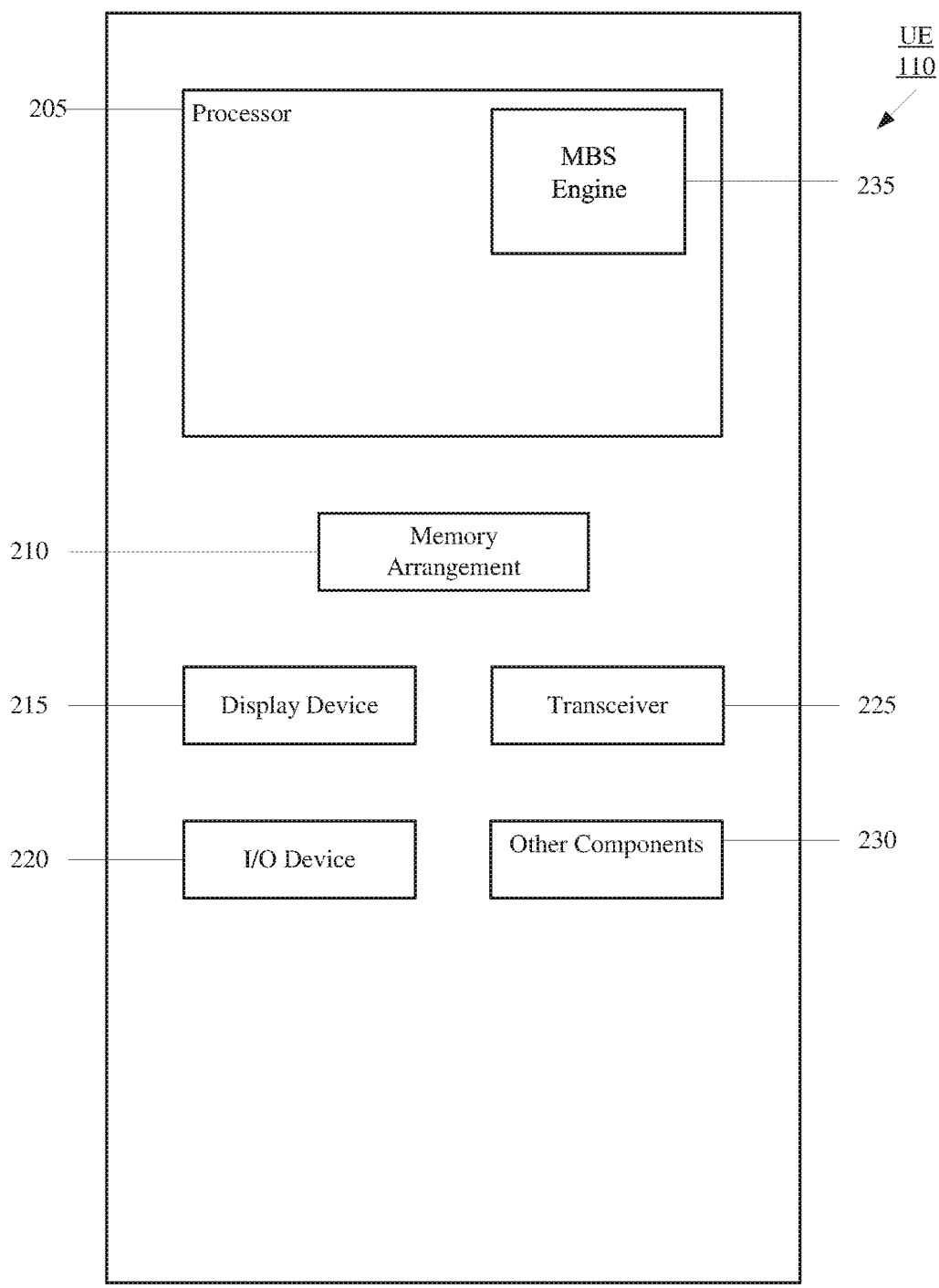
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225, and other components 230. The other components 230 may include, for example, an audio input device, an audio output device, a battery, a data acquisition device, ports to electrically connect the UE 110 to other electronic devices, sensors to detect conditions of the UE 110, etc.

The processor 205 may be configured to execute a plurality of engines for the UE 110. For example, the engines may include an MBS engine 235. The MBS engine 235 may perform various operations related to the UE 110 joining an MBS session, including receiving one or more keys for the purposes of encrypting and decrypting data related to the MBS session.

The above referenced engine being an application (e.g., a program) executed by the processor 205 is only exemplary. The functionality associated with the engine may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR RANs 120, 122 and other types of wireless networks. Accordingly, the transceiver 225 may operate on a variety of different frequencies or channels (e.g., set of consecutive frequencies).

Figure 3:
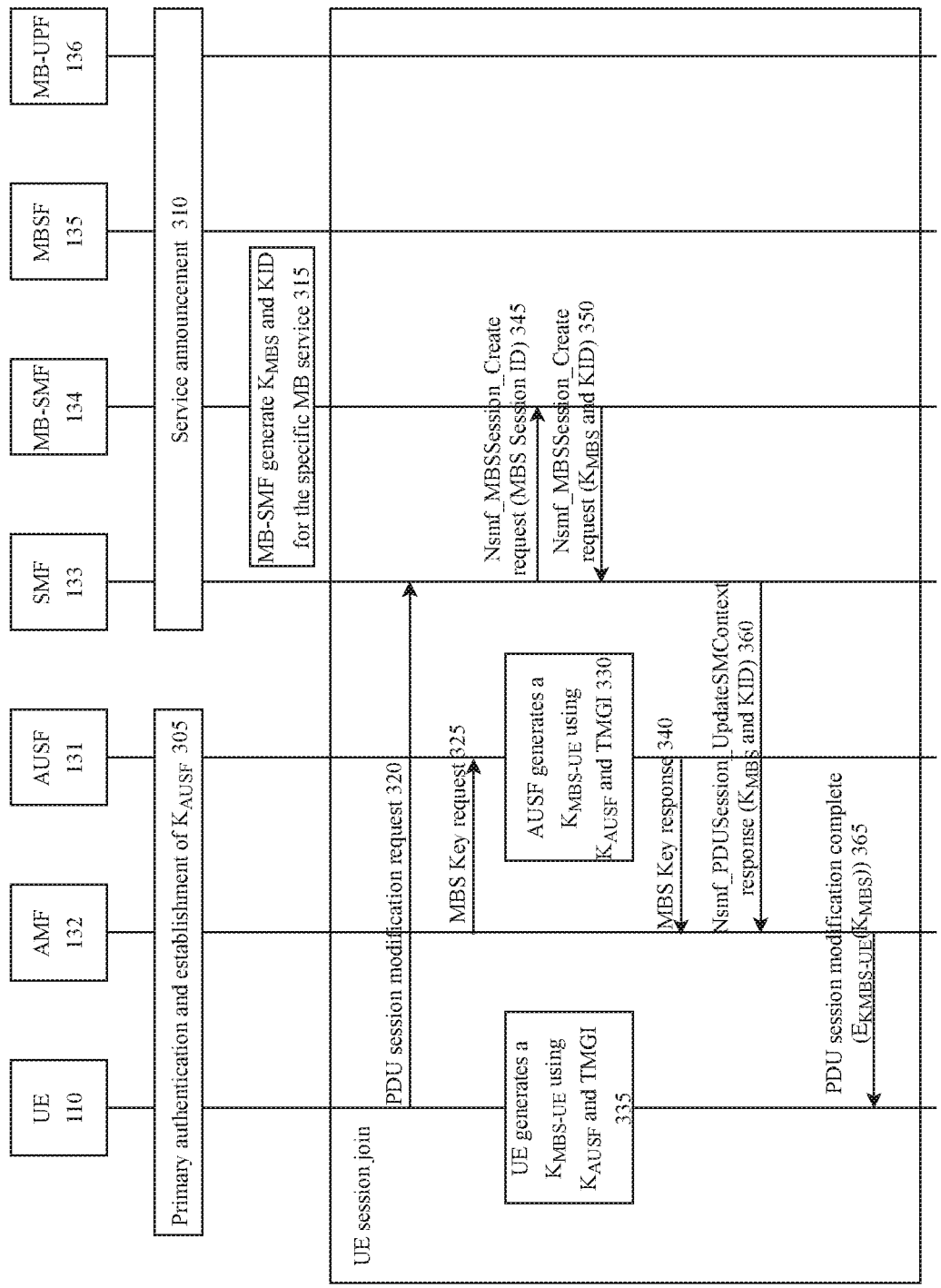
FIG. 3 shows an exemplary signaling diagram for key generation and distribution for an MBS multicast service according to various exemplary embodiments.

FIG. 3 shows an exemplary signaling diagram 300 for key generation and distribution for an MBS multicast service according to various exemplary embodiments. As described above, there is an existing procedure for a UE to join an MBS session based on a PDU session modification request from the UE. However, the PDU session modification complete message may not be encrypted, leading to an unprotected data flow. The exemplary signaling diagram 300 shows a procedure where the MBS key, $K_{MBS}$, is secured an encrypted using a shared key base.

Prior to describing the signaling diagram 300, it may be considered that there are several operations that may occur prior to the UE 110 attempting to join the MBS session. These operations may include, for example, the MBS session having been configured, the UE 110 registering in the Public Land Mobile Network (PLMN) and establishing a PDU session. It may also be considered that the UE 110 at least knows the MBS Session ID of a multicast group that the UE 110 can join. As will be described below, this knowledge may be based on a service announcement generated by the core network functions that may be broadcast by one or more nodes (e.g., gNB 120A) of the 5G NR RAN 120.

In 305, the UE 110 may initiate a primary authentication and establish a primary authentication key, $K_{AUSF}$, with the AUSF 131 in the home PLMN (HPLMN). Establishing a primary authentication is a defined procedure and is outside the scope of the present disclosure. However, it should be noted that there is a difference between the primary authentication and a service related authentication. The authentication being performed by the UE and network for the purpose of joining the MBS session is a service related authentication that is based on a key that is delivered to the UE rather than a pre-programmed key (e.g., stored in the SIM of the UE) as is used in a primary authentication procedure.

In 310, there is a service announcement for the MBS session. Again, this service announcement is defined procedure and is outside the scope of the present disclosure. The procedure for the service announcement is procedure defined in 3GPP TS 23.247 Clause 7.1.1.

In 315, the MB-SMF 134 generates a key, $K_{MBS}$, and key identification (KID) corresponding to the $K_{MBS}$ for the specific MBS. In this exemplary embodiment, the MB-SMF generates the $K_{MBS}$. However, in other exemplary embodiments, different network functions may generate the $K_{MBS}$, e.g., the MBSF 135, the MB-UPF 136, etc. The network function that generates the key may be based on a definition from the Service and System Aspects (SA) SA2.

In 320, the UE 110 begins the process to join a specific multicast group. As described above, the process begins with the UE 110 sending a PDU Session Modification Request to the SMF 133 that includes the MBS Session ID that indicates the multicast group that the UE 110 wants to join.

In 325, the AMF 132 sends an MBS key request to the AUSF 131 to request the shared key. As shown in the signaling diagram 300, the PDU Session Modification Request traverses the AMF 132 and the AUSF 131 and thus, these functions will understand that the UE 110 is attempting to join the MBS session. In addition, as will be described below, the AMF 132 is the network function that will ultimately communicate the PDU session modification complete message to the UE 110.

In 330, the AUSF 131 generates a key $K_{MBS-UE}$ using the $K_{AUSF}$ and a temporary mobile group identity (TMGI). In a corresponding operation 335, the UE also generates a key $K_{MBS-UE}$ using the $K_{AUSF}$ and the TMGI. The $K_{MBS-UE}$ is a new key to securely deliver the $K_{MBS}$ between the AMF and the UE. In the exemplary embodiments, the $K_{MBS-UE}$ is generated by the UE 110 and the AUSF 131 using the $K_{AUSF}$ and the TMGI because the UE 110 and the AUSF 131 independently have this information, e.g., it is common information between the UE 110 and the AUSF 131. In 340, the AUSF 131 provides a MBS key response including the $K_{MBS-UE}$ to the AMF 132 in response to the MBS key request 320.

As described above, the UE 110 sends a PDU Session Modification Request 320 to the SMF 133 that includes the MBS Session ID. The SMF 133 recognizes the request to be an MBS session join request based on the received MBS Session ID, the SMF recognize this is. In 345, the SMF 133 sends Nsmf_MBSSession_Create request including the MBS Session ID. This allows the SMF 133 to interact with the MB-SMF 134 to retrieve multicast QoS flow information of the indicated MBS session.

In response to 345, the MB-SMF 134 sends the $K_{MBS}$ and the KID to the SMF 133 using a Nsmf_MBSSession_Create response 350. As described above, in this example the MB-SMF 134 generates the $K_{MBS}$ and the KID and therefore has this information to send to the SMF 133. In other exemplary embodiments, the $K_{MBS}$ and the KID may be generated by other network functions, e.g., MBSF 135, MB-UPF 136, etc. In these other embodiments, the $K_{MBS}$ and the KID may be communicated to the MB-SMF 134 so that the MB-SMF 134 may communicate this information to the SMF 133 in 350. In an alternative, the SMF 133 may communicate with the other network function that generated $K_{MBS}$ and the KID to retrieve this information. In any event, the SMF 133 will obtain the $K_{MBS}$ and the KID.

In 360, the SMF 133 responds to the AMF 132 using Nsmf_PDUSession_UpdateSMContext response that may include N2 SM information and N1 SM container information. The N2 SM information may include, for example, the PDU Session ID, the MBS Session ID, the MB-SMF ID, the multicast Qos flow information, updated PDU Session information, mapping between unicast Qos flow and multicast Qos flow information. The N1 SM container information may include a PDU Session Modification Command, the KBs and the KID. Thus, at the completion of 360, the AMF 132 will have the $K_{MBS}$, the KID (received in 360) and the $K_{MBS-UE}$ (received in 340).

In 365, the AMF 132 sends the PDU session modification complete message to the UE 110 indicating the UE 110 has joined the requested MBS session. In some exemplary embodiments, the PDU session modification complete message 365 includes the encrypted $K_{MBS}$ ($E_{K_{MBS-UE}}(K_{MBS})$) and/or the encrypted KID. In other exemplary embodiments, the PDU session modification complete message 365 including the $K_{MBS}$ and KID is encrypted using the $K_{MBS-UE}$. As described above, the UE 110 has previously generated the $K_{MBS-UE}$ and may use this to decrypt the PDU session modification complete message 365 to obtain the $K_{MBS}$ and KID that may then be used to decrypt the MBS data traffic delivered to the UE 110. The $K_{MBS}$ may also be used to derive session keys used for encrypting the MBS session data. Thus, in this manner, the $K_{MBS}$ and KID are delivered securely and encrypted to the UE 110 such that malicious actors cannot obtain the $K_{MBS}$ and KID to access the MBS data traffic.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A processor of a user equipment (UE) configured to perform operations comprising:
   generating, for transmission to a network function, a protocol data unit (PDU) modification request comprising a request to join a multicast broadcast service (MBS) session;
   generating a first key ($K_{MBS-UE}$), wherein the $K_{MBS-UE}$ is generated using a primary authentication key and a temporary mobile group identification (TMGI), wherein the primary authentication key is established between the UE and a second network function;
   receiving a PDU session modification complete message comprising an encrypted second key ($K_{MBS}$) and a key identification (KID) corresponding to the $K_{MBS}$; and
   decrypting the $K_{MBS}$ using the $K_{MBS-UE}$.

2. The processor of claim 1, wherein the PDU modification request comprises an MBS session identification of the MBS session that the UE is requesting to join.

3. The processor of claim 1, wherein at least one of the $K_{MBs}$ and the KID is used by the UE to decrypt MBS session data.

4. The processor of claim 1, wherein the $K_{MBS}$ is used to derive session keys for encrypting the MBS session data.

5. One or more processors of a first network function configured to perform operations comprising:
  receiving an indication that a user equipment (UE) is requesting to join a multicast broadcast service (MBS) session;
  generating, in response to receiving the indication, a MBS key request to be transmitted a second network function;
  receiving, in response to the MBS key request, an MBS key response comprising a first key ($K_{MBS-UE}$) from the second network function, wherein the first key is generated independently by both the second network function and the UE;
  receiving, from a third network function, information related to the MBS session, wherein the information comprises a second key ($K_{MBS}$) and a key identification (KID) corresponding to the $K_{MBS}$; and
  generating, for transmission to the UE, a PDU session modification complete message comprising the $K_{MBS}$ and the KID, wherein at least the $K_{MBS}$ is encrypted using the $K_{MBS-UE}$.

6. The one or more processors of the first network function of claim 5, wherein the first network function comprises an access and mobility management function (AMF).

7. The one or more processors of the first network function of claim 5, wherein at least one of the $K_{MBs}$ and the KID is used to decrypt MBS session data and the $K_{MBS}$ is used to derive session keys for encrypting the MBS session data.

8. The one or more processors of the first network function of claim 5, wherein the second network function comprises an authentication server function (AUSF).

9. The one or more processors of the first network function of claim 5, wherein the third network function comprises a session management function (SMF).

10. The one or more processors of the first network function of claim 5, wherein the indication comprises a PDU session modification request by the UE.

11. A method, comprising:
  at a user equipment (UE):
    sending a protocol data unit (PDU) modification request comprising a request to join a multicast broadcast service (MBS) session;
    generating a first key ($K_{MBS-UE}$), wherein the $K_{MBS-UE}$ is generated using a primary authentication key and a temporary mobile group identification (TMGI), wherein the primary authentication key is established between the UE and a second network function;
    receiving a PDU session modification complete message comprising an encrypted second key ($K_{MBS}$) and a key identification (KID) corresponding to the $K_{MBS}$, and decrypting the $K_{MBS}$ using the $K_{MBS-UE}$.

12. The method of claim 11, wherein the PDU modification request comprises an MBS session identification of the MBS session that the UE is requesting to join.

13. The method of claim 11, wherein at least one of the $K_{MBs}$ and the KID is used by the UE to decrypt MBS session data.

14. The method of claim 11, wherein the $K_{MBS}$ is used to derive session keys for encrypting the MBS session data.

\* \* \* \* \*